United States Patent [19]

Sardisco et al.

[11] 4,060,586
[45] Nov. 29, 1977

[54] RECOVERY OF FLUORIDES FROM GYPSUM

[75] Inventors: John B. Sardisco, Shreveport, La.; Erhart Karl Drechsel, Houston, Tex.

[73] Assignee: Pennzoil Company, Shreveport, La.

[21] Appl. No.: 696,289

[22] Filed: June 15, 1976

[51] Int. Cl.² .......... C01F 1/00; C01F 5/00; C01F 11/00; C22B 26/20
[52] U.S. Cl. .......... 423/167; 423/170; 423/320; 423/321 R; 423/341; 423/555
[58] Field of Search .......... 423/170, 185, 167, 319, 423/320, 321 R, 341, 555; 71/34

[56] References Cited

U.S. PATENT DOCUMENTS

| 2,954,275 | 9/1960 | Carothers et al. | 423/341 |
| 2,954,287 | 9/1960 | Carothers et al. | 423/167 |
| 3,082,061 | 3/1963 | Barry et al. | 423/341 |
| 3,462,242 | 8/1969 | Barker et al. | 423/341 |
| 3,547,581 | 12/1970 | Gauster et al. | 423/555 |
| 3,795,728 | 3/1974 | Scheel | 423/320 |
| 3,840,639 | 10/1974 | Drechsel | 423/319 |
| 3,840,640 | 10/1974 | Drechsel | 423/319 |
| 3,949,047 | 4/1976 | Cherudon et al. | 423/555 |
| 3,956,464 | 5/1976 | Drechsel et al. | 423/167 |

*Primary Examiner*—O. R. Vertiz
*Assistant Examiner*—Eugene T. Wheelock
*Attorney, Agent, or Firm*—Lowe, King, Price & Markva

[57] ABSTRACT

In a process for the reaction of phosphate rock and sulfuric acid in the presence of potassium ion to form a mixture of phosphoric acid and a precipitated gypsum wherein the presence of the potassium ion causes precipitation of fluorides from the phosphate rock as potassium silicofluoride as a coprecipitate with the gypsum, and the phosphoric acid is separated from the gypsum slurry, the potassium silicofluoride is separated from the gypsum by extraction with phosphoric acid which may contain from 0-25 weight percent of sulfuric acid based on the amount of gypsum to be extracted or such phosphoric acid which may contain some fluorine. This extraction procedure provides a substantially fluoride-free gypsum product and an extraction solution containing recoverable potassium silicofluoride.

8 Claims, 2 Drawing Figures

RECOVERY OF FLUORIDES FROM GYPSUM

BACKGROUND OF THE INVENTION

1. Field of the Invention

This invention relates to a process for the recovery of fluorine-containing compounds from gypsum precipitates recovered from the acidulation of phosphate rock with sulfuric acid in the presence of potassium ion, and more particularly to a method for the extraction of the fluorides from the gypsum by means of certain phosphoric acid solutions.

2. Description of the Prior Art

Phosphoric acid plants are currently operated utilizing a basic and well known process for the acidulation of phosphate rock which comprises reaction of the rock with sulfuric acid to form phosphoric acid with subsequent reaction of the phosphoric acid with ammonia to produce ammonium phosphates. The phosphoric acid formed in this process is called wet process phosphoric acid. In this reaction, a by-product is gypsum having the chemical formula $CaSO_4.2H_2O$. Essentially, all phosphate rock contains some fluorine normally in the 3.0–4.0 percent range and the acidulation reaction usually generates gaseous fluorides which in prior years are usually evolved into the atmosphere or trapped with water scrubbing apparatus.

In recent years, air and water pollution law regulations have become more stringent and are now being enforced vigorously. Therefore, operators of phosphoric acid plants have had many pollution problems with fluorine emission in the atmosphere and with the by-product gypsum from these phosphoric acid plants. An important problem in the operation of these wet process phosphoric acid plants has been in the expensive methods necessary for handling the large amounts of fluorine compounds liberated in the gaseous and aqueous effluents from such plants. In some phosphate complexes from 10,000 to 30,000 tons per year of fluorine compounds may be liberated by various methods and it is estimated that in a typical wet process phosphoric acid plant, a portion of the fluorides are evolved in the atmosphere in gaseous form such as hydrogen fluoride and silicon tetrafluoride which can destroy vegetation and effect other facilities in close proximity to the plant if they are not scrubbed out, and such scrubbing systems are not always effective. A second portion of the fluorine is found in gypsum dumps and is subject to leaching into groundwater and streams. Still another portion of the fluorine remains with the final products and when such final products are used as fertilizers they may introduce fluorine into the soil. Only in recent years have studies been made on the effects of fluorides contained in final products and indications seem clear that they may have a deleterious effect on the long range producing ability of the soil, see for Example Kudzin et al., Chemical Abstracts, 73, 870534 (1970).

There is a great deal of literature and patent art related to attempts to remove the fluoride values from fluorine-containing phosphate rock in the operation of a phosphoric acid plant including methods for suppressing the evolution of fluoride values in the operation of a process and/or attempting to scrub the fluorine from effluent gases and waste water. Two such methods are described in U.S. Pat. No. 2,954,275 and 2,976,141 to Carothers et al. which use sodium or potassium compounds to suppress the fluorides so that they are concentrated in the gypsum cake. These patents indicate that this is achieved by adding a suppressing amount of an alkali metal salt to the acidulation reaction.

Other prior art attempts to overcome the problem of fluorine evolution and a reduction in the amount of fluorine contained in final products and a reference of this type is British Pat. No. 735,086 (1955), which discloses the acidulation of phosphate rock by a two step procedure using a strong mineral acid such as nitric acid or hydrochloric acid. In a similar process in U.S. Pat. No. 3,431,096, a process is disclosed for reducing evolution of fluorine values in formation of triple superphosphate fertilizer by reaction of phosphate rock and phosphoric acid wherein ammonia or urea is added to suppress the fluorine evolution.

Two additional patents of pertinence to processes of this type are U.S. Pat. Nos. 2,567,227 and 2,728,635 to Miller which disclose the acidulation of phosphate rock with phosphoric acid to form monocalcium phosphate, cooling to solidify the monocalcium phosphate and then converting it to dicalcium phosphate by hydrolysis. In the earlier patent, it is indicated that the fluorine in the rock is vaporized in the system, circulates throughout the system and/or leaves the system with the calcium phosphate. The later patent indicates that the process of U.S. Pat. No. 2,567,227 provided a final calcium phosphate product having a fluorine content too high to be of animal feed grade. The solution to this problem in the later patent was the addition of some dilute sulfuric acid in the acidulation step which would of course lead to additional fluorine evolution during the first step.

There are also patents known in the art which indicate that it is known to acidulate phosphate rock with phosphoric acid and to then recover solid monocalcium phosphate by cooling of the resulting solution and recovering the monocalcium phosphate. Processes of this type are disclosed for example in U.S. Pat. Nos. 3,494,735 and 3,645,676. In addition, U.S. Pat. Nos. 3,619,136 and 3,792,151 to Case disclose the reaction of phosphate rock with recycle phosphoric acid at temperatures of about 125°–180° F. (52° C. to 83° C.) to form a solution of monocalcium phosphate, reacting the latter solution with sulfuric acid to produce phosphoric acid and calcium sulfate, precipitating the calcium sulfate, and recycling a portion of the phosphoric acid to the phosphate rock reaction. These patents point out that under the conditions recited, fluorides are not evolved but remain primarily unreacted and may be found with insoluble materials although a portion remains in the phosphoric rock or a solubilized form with stoichiometric amounts of sulfuric acid and $KHSO_4$ in combination with other steps, and this reaction is described in U.S. Pat. Nos. 3,697,246 and 3,718,453.

In copending application Ser. No. 608,973, filed Aug. 29, 1975, of one of us, there is disclosed a process for the acidulation of phosphate rock and production of substantially pure alkali metal phosphates, calcium phosphates and phosphoric acid which comprises primarily the steps of acidulating phosphate rock with a phosphoric acid solution containing sufficient alkali metal values to provide potassium ions in the system and thus form an insoluble precipitate comprising a mixture of impurities, silicas and fluorides from which the fluorides can be recovered in usable form. It is a feature of this disclosure that the fluorides are not evolved into the atmosphere but are primarily recovered in the insoluble precipitate removed prior to gypsum precipitation. In addition, in prior U.S. Pat. No. 3,840,639 there is disclosed a process for the acidulation of phosphate rock by reaction of the rock with phosphoric acid in the presence of potassium ion.

There are many disclosures of processes in the art concerned with the acidulation of phosphate rock with sulfuric acid and other acids to form usually phosphoric acid and a gypsum precipitate. In such processes, the amount of fluorides evolved in the system have been a continuing problem as they are usually evolved into the atmosphere. In our copending prior filed application Ser. No. 696,290, filed June 15, 1976 there is disclosed a process whereby phosphate rock is acidulated with sulfuric acid in the presence of a controlled amount of potassium ion as $K_2O$ and a controlled amount of $SiO_2$, by which process the evolution of the fluorides is suppressed and precipitates with the gypsum precipitate. In this procedure, the resulting mixture of phosphoric acid and the precipitated gypsum is then separated to provide a phosphoric acid solution and a gypsum precipitate, the latter being substantially contaminated with the precipitated fluorides. The present invention is an improvement on this process.

In prior procedures, the art has not considered that it was necessary to recover the fluorides from the gypsum cake as the gypsum was usually passed to a gypsum pond. However, in view of the recent environmental considerations and because the present day economics, it is desirable that the gypsum be purified for use in other areas and also desirable to recover the fluorides contained in the gypsum.

In prior art relating to treatment of the gypsum, U.S. Pat. No. 3,795,728 to Scheel discloses a method for recovering alkali metal silicofluorides from gypsum by washing or leaching the gypsum with a hot wash filtrate, i.e., hot water. Usually, the wash filtrate has been cold saturated with alkali silicofluoride and the alkali silicofluoride contained in the extract is separated from the gypsum by extraction and crystallization.

U.S. Pat. No. 3,420,622 to Donges et al. disclose a method for recovering fluorine compounds by digesting phosphates with nitric acid, forming a suspension of finely divided calcium silicofluoride, extracting this mixture with acidified water and precipitating the silicofluoride in the form of potassium silicofluoride. In U.S. Pat. No. 3,579,322 to Higgins there is disclosed a concept of recycling a stream of pond water to a phosphate water plant operation which stream of pond water contains phosphates, sulfates, and silicofluorides and the silicofluorides are extracted by means of a cation exchange system.

U.S. Pat. No. 3,915,659 to Kadotani et al., discloses the purification of sodium silicofluoride by repulping sodium silicofluoride containing gypsum and/or phosphates. The repulping procedure effects substantial removal of impurities and obtains sodium silicofluoride free from gypsum with the process comprising the addition of an alkali metal material thereto.

Further, a large number of patents are known in the prior art which are concerned with the precipitation and recovery of alkali metal silicofluorides from phosphoric acid. However, the problems in recovery of the silicofluoride from the acid are distinctly different from those presented with respect to recovery of the alkali silicofluorides from gypsum since the patents indicate that the fluorides my be simply precipitated from the phosphoric acid solution.

The present invention provides a procedure whereby the acidulation reaction may be conducted under conditions such that the fluorides are precipitated with the gypsum leaving a phosphoric acid solution substantially free of fluorides and thereafter these fluorides are effectively extracted from the gypsum mixture in recoverable form.

SUMMARY OF THE INVENTION

It is accordingly one object of this invention to provide a method for conducting acidulation reactions in the substantial absence of fluorine evolution whereby all essential products may be recovered in substantially pure form.

A further object of the invention is to provide a method for the acidulation of phosphate rock with sulfuric acid wherein the fluorides contained in the rock are precipitated during the acidulation reaction with the gypsum and are subsequently recovered from the gypsum by an extraction procedure.

A still further object of the invention is to provide a method for the acidulation of phosphate rock wherein the fluorides are precipitated with the gypsum mixture rather than evolved into the atmosphere and the resulting mixture of gypsum and alkali metal silicofluorides is then extracted with a mineral acid mixture to separate the alkali metal silicofluorides from the gypsum.

Other objects and advantages of the present invention will become apparent as the description thereof proceeds.

In satisfaction of the foregoing objects and advantages there is provided by this invention a method for conducting an acidulation reaction which comprises reacting phosphate rock and sulfuric acid in a presence of sufficient alkali ion as $R_2O$ where R is alkali metal, to cause the precipitation of fluorides contained in the rock as alkali silicofluoride, continuing the acidulation reaction to obtain reaction products comprising a phosphoric acid solution, and a gypsum precipitate containing the potassium silicofluoride, separating the gypsum precipitate from the phosphoric acid solution and extracting the gypsum precipitate in an extractor with an extractant material selected from the group consisting of (a) phosphoric acid which may contain from 0–25 weight percent of sulfuric acid, the amount of sulfuric acid being based on the weight of the gypsum being extracted, and (b) a fluorine-containing phosphoric acid solution which may contain from 0–25 weight percent of sulfuric acid, the amount of sulfuric acid being based on the weight of the gypsum being extracted. The extraction is carried out by contacting the gypsum mixture with a ratio of 3–10 parts of extractant material per part of gypsum mixture at a temperature of 60°–100° C. until the extraction is complete, separating and recovering the gypsum solid and an extraction solution containing the alkali metal silicofluoride. Also provided by this invention are methods for conducting this process in a continuous manner with recycle of essential solutions and methods for recovery of the alkali metal silicofluoride as a valuable fluoride-containing product from the extractant solution.

BRIEF DESCRIPTION OF THE DRAWING

Reference is now made to the drawing accompanying this application wherein.

DESCRIPTION OF PREFERRED EMBODIMENTS

Figure 1:
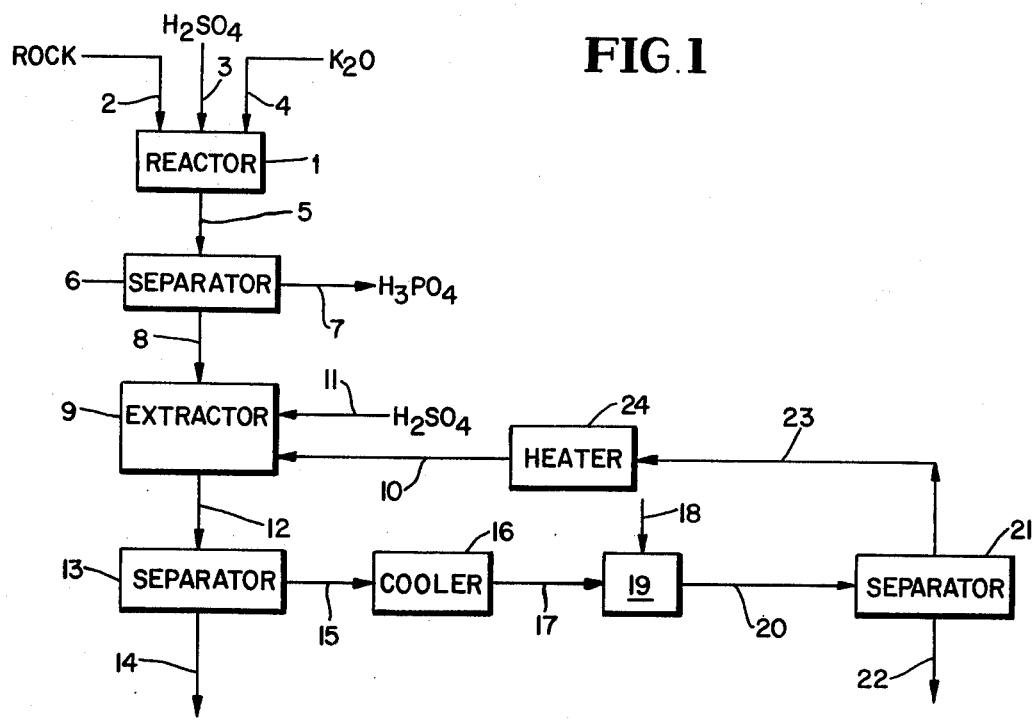
FIG. 1 represents one embodiment of the invention for conducting a continuous process utilizing a phosphoric acid solution as the extractant material.

As pointed out above, this invention is concerned with methods for conducting acidulation reactions in the substantial absence of fluorine pollution and under such conditions that the fluorides present in the system precipitate with the calcium sulfate gypsum precipitate and are separated from the phosphoric acid product on separation of the gypsum mixture from the phosphoric acid.

In conducting the reaction generally, the fluoride-containing phosphate rock is acidulated with sulfuric acid in the presence of sufficient alkali metal ion as $R_2O$ where R is alkali metal to cause the fluorides contained in the rock to precipitate as an alkali metal silicofluoride salt. When potassium is the alkali metal ion, the $K_2O$ causes precipitation of the fluorides as potassium silicofluoride. Since potassium is the most preferred alkali metal the invention will be described hereinafter with respect to potassium ion in the system. Under the conditions of the reaction, the fluoride precipitates rather than being evolved into the atmosphere and will be in admixture with the gypsum precipitate formed as a reaction product of the acidulation reaction. The resulting slurry is then filtered and the phosphoric acid removed from the system, the phosphoric acid containing any residual potassium ion not required to precipitate potassium silicofluoride. The resultant gypsum filter cake will contain the potassium silicofluoride in intimate admixture and the present invention provides systems whereby the potassium silicofluoride may be recovered and separated from the gypsum and then regenerated to provide means for fluoride recovery from this system.

In the basic reaction of the invention, sulfuric acid and phosphate rock are reacted at temperatures ranging from 50°-90° C. with sufficient sulfuric acid being present to theoretically completely acidulate the phosphate rock. The reaction is conducted at a temperature of about 50°-90° C., preferably 60° C. to 75° C. for a time sufficient to achieve adequate gypsum crystal growth, usually over a period of about 3 to 12 hours.

In order to suppress fluorine evolution and effect precipitation of the fluorine as potassium silicofluoride in conducting this process, there is maintained in the acidulation reactor an amount of $K_2O$ as potassium ion in order to supply the amount necessary to combine with the available fluoride. Generally, it is preferred in this invention that the amount of potassium ion present in the mixture be of such concentration that the resulting $H_3PO_4$ filtrate will contain about 0.5 to 1.0 weight percent $K_2O$ content. The potassium ion may be provided as $K_2O$ by the addition to the mixture of KOH, $KH_2PO_4$, $KHSO_4$, $K_2SO_4$, mixtures thereof and the like.

In this initial reaction the sulfuric acid acts on the rock to form phosphoric acid and gypsum, that is $CaSO_4.2H_2O$. The 3-4% of fluorine present in the rock under ordinary circumstances would be evolved because of the temperatures under which the reaction is conducted. However, with the addition of the indicated amount of potassium ion in the mixture and the silica already present in the rock, a substantial portion of the fluorine will combine with the potassium and the silica to form potassium silicofluoride. Therefore, as a result of this reaction there will be formed a solution of phosphoric acid with a precipitate of gypsum in admixture with the potassium silicofluoride formed.

The mixture resulting from the initial reaction is then filtered to provide a solution of phosphoric acid which will contain any excess potassium ion and a filter cake comprising the mixture of gypsum and potassium silicofluoride.

According to the present invention, it has been discovered that the gypsum which contains the potassium silicofluoride may be extracted with certain acidic extractant solutions under certain extraction conditions. Thus, it has been found that the gypsum may be extracted by intimate contact with an aqueous phosphoric acid solution which may optionally contain from 0-25 percent of sulfuric acid in the phosphoric acid solution. The phosphoric acid solution should be of about 5-30 percent strength based on $P_2O_5$ content and the amount of sulfuric acid present if desired should be up to about 0.3 parts of sulfuric acid per part of gypsum to be extracted. The amount of sulfuric acid contained in the phosphoric acid is defined as being from 0-25 percent by weight based on the parts by weight of gypsum to be extracted.

In one embodiment of the invention the extraction process is conducted using phosphoric acid of about 5-30 weight percent strength as $P_2O_5$ which may contain the sulfuric acid as described. In a further aspect of the invention the phosphoric acid may be phosphoric acid which contains some fluorine. In this embodiment, the use of the fluorine-containing phosphoric acid enhances the economics of the process by reuse of the phosphoric acid in a continuous system. The phosphoric acid solution containing the fluorine is obtained by washing the gypsum solids obtained from the extraction steps with hot wash water. The wash water filtrate recovered from this washing step contains unextracted fluorine from the gypsum solids as well as $P_2O_5$ values from the gypsum solids. The resulting wash solution contains about 5-25 weight percent $P_2O_5$ and at least some fluorine as potassium silicofluoride.

The gypsum mixture is extracted with about 3-10 parts by weight of the acid extractant per part of the gypsum to be extracted. The extraction reaction is conducted at a temperature of about 60°-100° C. for best results.

In preferred continuous procedures for conducting the reaction, the phosphoric acid extractant solution, after completion of the procedure whereby the potassium silicofluoride is extracted into the phosphoric acid, is then cooled and additional $K_2O$ as potassium ion and optionally, silicon dioxide, added to the mixture to effect precipitation of the potassium silicofluoride which may then be recovered as a solid. The resulting phosphoric acid may then be recycled as extractant solution to the extractor or a portion may be recycled to the initial acidulation reactor to provide additional values of $K_2O$ in the system.

Reference is now made to FIG. 1 of the present application wherein there is described a continuous process for conducting the reaction using a phosphoric acid solution as extractant. In the schematic diagram as shown, acidulation reactor 1 is provided maintained at a temperature of about 50°-90° C. into which is introduced phosphate rock through line 2 and sulfuric acid through line 3 in stoichiometric amounts. Potassium ion as $K_2O$ was introduced through line 4 as $KH_2PO_4$, KOH, $KHSO_4$ or $K_2SO_4$ in sufficient amounts to effectively prevent the evolution of the fluoride contained in the phosphate rock and cause formation of potassium silicofluoride during the reaction. On completion of the acidulation reaction the resulting products are phosphoric acid containing any excess $K_2O$ in solution together with a precipitated mixture of gypsum and potassium silicofluoride. This mixture is removed through line 5 to filter 6 where the phosphoric acid solution is removed by line 7.

The resulting gypsum precipitate is then removed to extractor 9. Extractor 9 is maintained at a temperature of about 60°–100° C. Into extractor 9 is introduced a phosphoric acid extractant solution comprising sufficient phosphoric acid to maintain a ratio of about 3–10 parts of phosphoric acid per part by weight of the gypsum being extracted. The phosphoric acid is of about 5–30 percent strength as $P_2O_5$ and is preferably recycled phosphoric acid and may contain extracted potassium silicofluoride in solution, preferably in the range of 0.3 to 0.5 weight percent. This phosphoric acid has preferably been heated to substantially the same temperature as the mixture maintained in the extractor.

As an optional embodiment, sulfuric acid may be introduced into the extractor through line 11 in an amount of about 0–25 weight percent based on the weight of the gypsum being extracted. This represents up to about 0.3 parts of sulfuric acid per part of gypsum to be extracted.

The resulting gypsum and extractant solution are maintained under intimate conditions to effect the extraction in extractor 9 and the resulting mixture is then removed by line 12 to separator 13, which is maintained at essentially the same temperature as the extractor 9. In separator 13 the gypsum from which the potassium silicofluoride has been extracted, is removed by line 14. The filtrate of phosphoric acid, which will be a solution of the phosphoric acid containing extracted $K_2SiF_6$ at a temperature of about 70°–100° C. will contain from about 0.7 to 1.0 weight percent of potassium silicofluoride with up to 1.4 percent of sulfuric acid contained therein if the sulfuric acid is employed. It should be noted that the gypsum filter cake may be washed with hot wash water which water may then be recycled to the main acidulation reactor or to the extractor. The separator used in removing the solids from the solution may be a filter, thickener or the like.

The phosphoric acid filtrate from line 15 is then cooled in cooler 16 to a range of about room temperature to about 60° C., preferably 40° C., and then passed by line 17 to vessel 19 into which may be added silicon dioxide and/or potassium ion as $K_2O$, such as $KHSO_4$ via line 18 to cause the precipitation of potassium silicofluoride. The $SiO_2$ addition may be any amount up to about 0.5 weight percent based on the amount of phosphoric acid. The $SiO_2$ values may be supplied by the addition of water glass, amorphous sodium silicate and the like. The mixture is then passed by line 20 to separator 21 wherein a separation is made between the precipitated potassium silicofluoride which is removed by line 22 to leave a solution of phosphoric acid. The phosphoric acid is recycled by line 23 to heater 24 where it is then heated up to the temperature of the extractor and introduced into extractor 9 for additional extraction.

Figure 2:
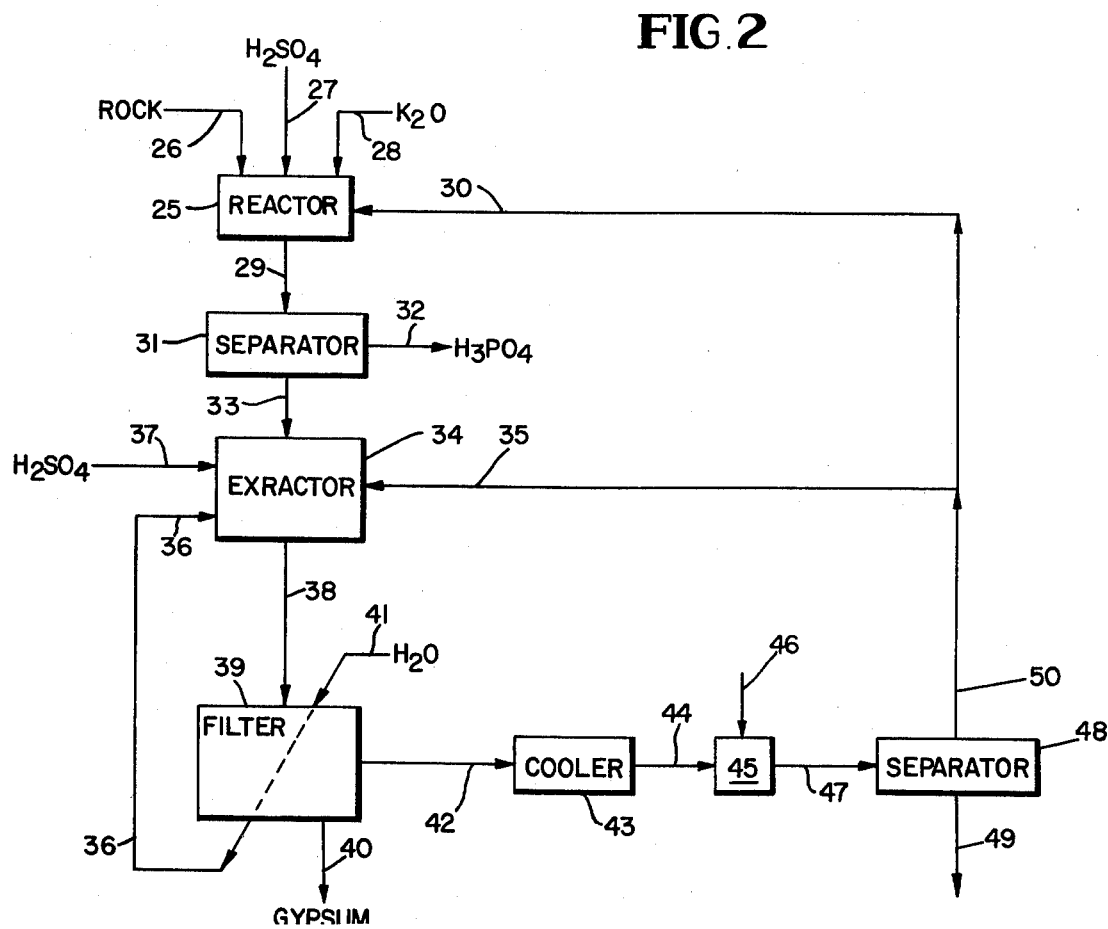
FIG. 2 represents a schematic diagram of a continuous process for extracting the gypsum mixture with a phosphoric acid solution containing some fluoride.

Referring now to FIG. 2 accompanying the application where a second embodiment of the invention is shown, it will be seen that into acidulation reactor 25 is introduced phosphate rock through line 26, sulfuric acid through line 27 and the $K_2O$ such as $KH_2PO_4$, KOH, $KHSO_4$ or $K_2SO_4$, through line 28 in sufficient amounts to cause precipitation of the fluorides as potassium silicofluorides as described for FIG. 1. The resulting mixture of phosphoric acid and precipitated gypsum containing potassium silicofluoride is removed through line 29 to separator 31 where the gypsum precipitate is separated from the phosphoric acid and the latter, which contains any unused $K_2O$, is removed through line 32. The gypsum precipitate containing the fluorides is removed by line 33 to extractor 34 which is maintained at a temperature of about 60°–100° C. Into extractor 34 is introduced phosphoric acid extractant from line 36 containing about 5–25 weight percent $P_2O_5$. Sufficient amounts of phosphoric acid are introduced into the extractor to maintain about 3–10 parts of phosphoric acid and sulfuric acid mixture per part of gypsum in the extractor. The phosphoric acid from line 36 is obtained by washing the gypsum with hot water as described hereinafter. In an optional step, from 0–25 parts by weight percent of sulfuric acid may be introduced through line 37, which sulfuric acid should be added in sufficient amounts to provide up to about 0.3 parts of $H_2SO_4$ per part of gypsum to be extracted.

The resulting extraction slurry is then removed through line 38 to separator 39 maintained at the same temperature as the extractor and the gypsum filter cake removed by line 40. Hot wash water (60°–100° C.) is added by line 41 to wash the filter cake and maintain the liquid concentration in the system. As this wash water washes the gypsum filter cake, it dissolves phosphoric acid and $K_2SiF_6$ contained therein to the extent that the water removed by line 36 will contain about 5–25 weight percent $P_2O_5$ and contains $K_2SiF_6$ in solution. It is then recycled by line 36 as weak phosphoric acid to extractor 34.

From separator 39 is obtained a phosphoric acid extractant solution which now contains potassium silicofluoride in an amount of from about 0.7 to 1.4 weight percent and this solution is removed through line 42, cooled in cooler 43 to a temperature between room temperature and 60° C. and then passed by line 44 to mixing vessel 45. There may be added to mixing vessel 45 silicon dioxide and/or potassium ion by line 46 as described for FIG. 1 to provide sufficient amounts of these materials to cause all the fluorine present to form potassium silicofluoride which will then precipitate. The resulting mixture is removed through line 47 to separator 48 from which the potassium silicofluoride is recovered by line 49 as a solid.

The phosphoric acid filtrate as a recycle stream is then removed through line 50. This recycle stream will generally contain about 0.5 to 2.5 weight percent $K_2O$, about 0.3 to 0.7 weight percent $K_2SiF_6$ and about 5–20 weight percent $P_2O_5$ in water solution. From line 50 a side stream may be passed by line 35 to the extractor 34 to adjust the total solids in the extractor and aid in the extraction. The remaining phosphoric acid is recycled to acidulation reactor 25 by line 30.

The following examples are presented to illustrate the invention but it is not to be considered as limited thereto. In the examples and throughout the specification, parts are by weight unless otherwise indicated.

In the following examples the gypsum mixture to be extracted was obtained by the reaction of 15 mols of phosphate rock and 150 mols sulfuric acid at 75° C. A recycle stream introduced into the reactor provided 10 mols $KH_2PO_4$, 10 mols phosphoric acid, 20 mols gypsum and 1 mol $K_2SiF_6$ and a second recycle stream provided a phosphoric acid stream containing 43 mols $P_2O_5$. On completion of the acidulation reaction the slurry was filtered to remove the phosphoric acid filtrate and provide a gypsum cake containing potassium silicofluoride. The recovered gypsum was then treated as described in the following examples.

phosphoric acid extractant solution removed as much as 94.4 weight percent of the fluorine in Examples 2 and 3.

TABLE I

EXTRACTION OF $K_2SiF_6$ FROM GYPSUM

| Composition of Starting Materials (wt.%) | | | $K_2O$ | $P_2O_5$ | F |
|---|---|---|---|---|---|
| $H_3PO_4$ (before dilution) | | | 0.69 | 28 | 0.25 |
| Gypsum | | | 1.32 | — | 1.42 |

Wt. of Gypsum used for all tests - 25 gms

| | CONDITIONS | | | Wt.% Extracted Based on solids Analysis | |
|---|---|---|---|---|---|
| Ex. No. | Temp (° C) | Gms 96% $H_2SO_4$ | Gms Acid Solution | % $P_2O_5$ in Acid Solution | $K_2O$ | F |
| 1 | 85 | 0.0 | 75 | 10 | 98.8 | 88.9 |
| 2 | 85 | 0.0 | 75 | 15 | 99.1 | 94.4 |
| 3 | 85 | 0.0 | 75 | 20 | 97.3 | 94.4 |
| 4 | 85 | 0.0 | 75 | 30 | 89.1 | 80.6 |
| 5 | 85 | 0.0 | 50 | 10 | 90.0 | 83.3 |
| 6 | 85 | 0.0 | 50 | 15 | 80.9 | 75.0 |
| 7 | 85 | 0.0 | 50 | 20 | 81.8 | 75.0 |
| 8 | 85 | 0.0 | 50 | 30 | 66.7 | 69.4 |
| 9 | 65 | 0.0 | 75 | 10 | 93.9 | 88.9 |
| 10 | 65 | 0.0 | 75 | 15 | 87.9 | 72.2 |
| 11 | 65 | 0.0 | 75 | 20 | 78.8 | 72.2 |
| 12 | 65 | 0.0 | 75 | 30 | 48.5 | 44.4 |
| 13 | 65 | 0.0 | 50 | 10 | 75.8 | 61.1 |
| 14 | 65 | 0.0 | 50 | 15 | 69.7 | 61.1 |
| 15 | 65 | 0.0 | 50 | 20 | 48.5 | 36.1 |
| 16 | 65 | 0.0 | 50 | 30 | 63.6 | 58.3 |
| 17 | 65 | 7.0 | 38 | 30 | 60.6 | 83.0 |
| 18 | 65 | 3.0 | 38 | 30 | 51.5 | 50.0 |
| 19 | 65 | 1.5 | 38 | 30 | 48.5 | 36.0 |
| 20 | 65 | 0.0 | 38 | 30 | 51.5 | 44.0 |
| 21 | 65 | 7.0 | 57 | 20 | 81.8 | 75.0 |

EXAMPLES 1-21

In the first set of examples the extractions of the gypsum cake were carried out with $H_3PO_4$ not saturated with fluoride at the extraction temperature. The phosphoric acid used for the extraction had been stored at room temperature and was decanted for use in the extraction. Parameters for the extraction that were varied included extraction temperature, concentration of the acid solution, ratio (weight) of acid solution to gypsum and the amount of $H_2SO_4$ used. The concentration of the acid solution indicated the degree by which it was diluted. The extractions were carried out in small bottles which were tumbled in a water bath for two hours at a controlled temperature. The results are set forth hereinafter in Table I. As may be seen from the table the

EXAMPLES 22-54

In a second set of experiments the phosphoric acid extractant solution was saturated with F and other impurities by reacting the $H_3PO_4$ with gypsum prior to its use. The parameters that were varied were the same as those for Examples 1-21. These reactions were conducted as follows: The phosphoric acid was reacted with the $K_2SiF_6$ containing-gypsum at 65°-70° C. for 16 hours to saturate it with the impurities. After this period the slurry was filtered at the reaction temperature and the resulting acid was immediately used for extracting the $K_2SiF_6$ from a fresh batch of gypsum. The extraction tests were carried out at 65° C. or 85° C. for 2 hours in small bottles which were tumbled in the water bath. Results of these tests are set forth in Table II.

TABLE II

EXTRACTION OF $K_2SiF_6$ FROM GYPSUM WITH $H_3PO_4$ CONTAINING F AT 65° C. AND $H_2SO_4$

| Composition of Starting Material (Wt.%) | | | $K_2O$ | $P_2O_5$ | F |
|---|---|---|---|---|---|
| $H_3PO_4$ (before dilution) | | | 1.2 | 29 | 0.33 |
| Gypsum | | | 1.96 | — | 1.51 |

Wt. of Gypsum used for all tests - 25 gms

| | CONDITIONS | | | Wt.% Extracted Based on Solids Analysis | |
|---|---|---|---|---|---|
| Ex. No. | Temp. (° C) | Gms 96% $H_2SO_4$ | Gms Acid Solution | % $P_2O_5$ in Acid Solution | $K_2O$ | F |
| 22 | 65 | 0.0 | 75 | 10 | 71.4 | 48.3 |
| 23 | 65 | 0.0 | 75 | 15 | 63.3 | 43.0 |
| 24 | 65 | 0.0 | 75 | 20 | 65.3 | 27.8 |
| 25 | 65 | 0.0 | 50 | 10 | 59.2 | 39.1 |
| 26 | 65 | 0.0 | 50 | 15 | 55.1 | 33.8 |
| 27 | 65 | 0.0 | 50 | 20 | 49.0 | 26.5 |
| 28 | 85 | 0.0 | 75 | 10 | 93.9 | 86.8 |
| 29 | 85 | 0.0 | 75 | 15 | 85.7 | 80.8 |
| 30 | 85 | 0.0 | 75 | 20 | 81.6 | 66.7 |
| 31 | 85 | 0.0 | 50 | 10 | 83.7 | 64.2 |
| 32 | 85 | 0.0 | 50 | 15 | 77.6 | 60.9 |
| 33 | 85 | 0.0 | 50 | 20 | 75.5 | 53.6 |
| 34 | 85 | 1.5 | 75 | 10 | 91.8 | 87.4 |
| 35 | 85 | 3.0 | 75 | 10 | 98.0 | 94.7 |
| 36 | 85 | 7.0 | 75 | 10 | 98.0 | 92.7 |
| 37 | 85 | 1.5 | 75 | 15 | 85.7 | 80.8 |
| 38 | 85 | 3.0 | 75 | 15 | 87.8 | 82.8 |
| 39 | 85 | 7.0 | 75 | 15 | 93.9 | 72.2 |
| 40 | 85 | 1.5 | 75 | 20 | 79.6 | 64.9 |
| 41 | 85 | 3.0 | 75 | 20 | 81.6 | 64.9 |

TABLE II-continued
EXTRACTION OF $K_2SiF_6$ FROM GYPSUM WITH $H_3PO_4$ CONTAINING F AT 65° C. AND $H_2SO_4$

| Composition of Starting Material (Wt.%) | | | $K_2O$ | $P_2O_5$ | F |
|---|---|---|---|---|---|
| $H_3PO_4$ (before dilution) | | | 1.2 | 29 | 0.33 |
| Gypsum | | | 1.96 | — | 1.51 |

Wt. of Gypsum used for all tests - 25 gms

| | CONDITIONS | | | Wt.% Extracted Based on Solids Analysis | |
|---|---|---|---|---|---|
| Ex. No. | Temp. (° C) | Gms 96% $H_2SO_4$ | Gms Acid Solution | % $P_2O_5$ in Acid Solution | $K_2O$ | F |
| 42 | 85 | 7.0 | 75 | 20 | 83.7 | 79.5 |
| 43 | 85 | — | 75 | 10 | 87.8 | 81.6 |
| 44 | 85 | — | 75 | 10 | 87.8 | 81.6 |
| 45 | 85 | — | 75 | 10 | 89.8 | 76.3 |
| 46 | 85 | — | 75 | 10 | 89.8 | 84.2 |
| 47 | 85 | — | 75 | 10 | 89.8 | 84.2 |
| 48 | 85 | 7.0 | 75 | 15 | 91.8 | 94.7 |
| 49 | 85 | 7.0 | 75 | 15 | 95.9 | 97.4 |
| 50 | 85 | 7.0 | 75 | 15 | 95.9 | 94.7 |
| 51 | 85 | 2.0 | 75 | 15 | 95.9 | 92.1 |
| 52 | 85 | 7.0 | 75 | 15 | 95.9 | 94.7 |
| 53 | 85 | 7.0 | 75 | 15 | 95.9 | 92.1 |
| 54 | 85 | 7.0 | 75 | 15 | 95.9 | 92.1 |

EXAMPLES 55-58

For a complete process it is necessary to recover the $K_2SiF_6$ from the extraction reactor filtrate by cooling and/or by the addition of a $K_2O$ bearing compound such as $KHSO_4$ or $KH_2PO_4$. The following examples were carried out during which all three steps were carried out: (1) saturation of the $H_3PO_4$ with impurities, (2) extraction of $K_2SiF_6$ from the gypsum, and (3) recovery of the $K_2SiF_6$ from the extraction filtrate. The first two steps were carried out as described in the previous examples and the $K_2SiF_6$ recovery step was carried out by permitting the filtrate to set overnight at a given temperature with or without the addition of $KHSO_4$. The conditions and results of four examples 55, 56, 57 and 58, are given in Table III. The data is presented as follows: Under each test the first line labeled $H_3PO_4$ saturation gives the conditions and analyses of the resulting saturated acid that was used in the extraction step. The second line, the extraction step, gives the conditions for the extraction; the resulting analyses of the resulting filtrate and filter cake; and the percentage of F extracted. The third line, the $K_2SiF_6$ precipitation step, gives the conditions and results for this step. It also gives the percentage of F recovered in the precipitate based on the F in the gypsum from which it was extracted. For examples 55, 57 and 58, different temperatures were used for the precipitation step. Also, in some examples $KHSO_4$ was added during the precipitation step, and for others it was not. These examples are as follows:

TABLE III
CONDITIONS AND RESULTS OF THE THREE STEP TESTS TO EXTRACT AND RECOVER $K_2SiF_6$

| Example No. and Step | Conditions | | | | | Filtrate (Resulting) | | | | |
|---|---|---|---|---|---|---|---|---|---|---|
| | Gms Gyp | Gms Acid | Gms(1) $H_2SO_4$ | Gms $KHSO_4$ | Temp. °C | Wt.% | Gms | Wt.% | Gms | Wt.% |
| Example 55 | | | | | | | | | | |
| $H_3PO_4$ | — | — | — | — | 70 | 1.13 | — | 0.31 | — | 24.5 |
| Extraction | 100 | 300 | 28 | — | 85 | 0.78 | 2.98 | 0.46 | 1.76 | 28 |
| Precipitation | — | 382 | — | 16.3 | 25 | 1.91 | 7.48 | 0.13 | 0.51 | — |
| Example 56 | | | | | | | | | | |
| $H_3PO_4$ | — | — | — | — | 70 | 1.21 | 2.42 | 0.29 | 0.58 | 20 |
| Extraction | 100 | 300 | 28 | — | 85 | 0.91 | 3.37 | 0.49 | 0.79 | — |
| Precipitation | — | 370 | — | 20.6 | 60 | 1.86 | 6.62 | 0.24 | 0.88 | — |
| Precipitation | — | 370 | — | 20.6 | 40 | 2.08 | 7.45 | 0.22 | 0.79 | — |
| Precipitation | — | 370 | — | 20.6 | 25 | 1.88 | 6.76 | 0.19 | 0.69 | — |
| Example 57 | | | | | | | | | | |
| $H_3PO_4$ | — | — | — | — | 70 | 0.80 | 2.20 | 0.31 | 0.85 | 22.5 |
| Extraction | 183 | 550 | 51.3 | — | 85 | 0.86 | 5.04 | 0.54 | 0.75 | 10.8 |
| Precipitation | — | 586 | — | 31.3 | 60 | 2.31 | 13.6 | 0.2 | 1.17 | 10.6 |
| Precipitation | — | 586 | — | 0.0 | 60 | 0.68 | 3.89 | 0.42 | 2.39 | 10.2 |
| Precipitation | — | 586 | — | 31.3 | 40 | 2.28 | 13.5 | 0.21 | 1.27 | 10.9 |
| Precipitation | — | 586 | — | 0.0 | 40 | 0.53 | 3.0 | 0.45 | 2.56 | 10.9 |
| Example 58 | | | | | | | | | | |
| $H_3PO_4$ | — | — | — | — | 70 | 0.8 | 3.2 | 0.31 | 1.24 | — |
| Extraction | 200 | 600 | 56 | — | 85 | 0.98 | 6.36 | 0.51 | 0.72 | 13.75 |
| Precipitation | — | 649 | — | 34.6 | 60 | 2.45 | 16.19 | 0.21 | 1.41 | 14.11 |
| Precipitation | — | 649 | — | 0.0 | 60 | 0.76 | 4.0 | 0.43 | 2.28 | 14.61 |
| Precipitation | — | 649 | — | 34.6 | 40 | 2.26 | 14.75 | 0.15 | 0.99 | 13.36 |
| Precipitation | — | 649 | — | 0 | 40 | 0.62 | 3.89 | 0.26 | 1.67 | 14.42 |

| Example No. and Step | Cake (Resulting) | | | | Wt.% F Extr. | Wt.% F Ppt | |
|---|---|---|---|---|---|---|---|
| | Wt.% | Gms | Wt% | Gms | | (1) From Soln. | Based on Orig. Gyp |
| Example 55 | | | | | | | |
| $H_3PO_4$ | — | — | — | — | — | — | — |

TABLE III-continued

| | | | | | | | |
|---|---|---|---|---|---|---|---|
| Extraction | 0.17 | 0.15 | 0.05 | 0.05 | 96.7 | — | — |
| Precipitation | 33.36 | 1.49 | 35.1 | 1.57 | — | 89 | 100.4 |
| Example 56 | | | | | | | |
| H₃PO₄ | | | | | | | |
| Extraction | 0.46 | 0.38 | 0.63 | 0.51 | 66 | — | — |
| Precipitation | 26.13 | 1.44 | 28.64 | 1.57 | — | 87 | 104 |
| Precipitation | 24.04 | 1.81 | 19.58 | 1.44 | — | 80 | 95.4 |
| Precipitaton | 26.71 | 1.34 | 28.0 | 1.44 | — | 80 | 95.4 |
| Example 57 | | | | | | | |
| H₃PO₄ | | | | | | | |
| Extraction | — | — | 0.0 | — | 100 | — | — |
| Precipitation | 30.4 | 2.3 | 33.4 | 2.49 | — | 78 | 89.9 |
| Precipitation | 25.5 | 1.1 | 28.44 | 1.21 | — | 38 | 43.7 |
| Precipitation | 28.3 | 2.5 | 32.08 | 2.86 | — | 103 | 89.7 |
| Precipitation | 26.7 | 1.6 | 32.07 | 1.97 | — | 62 | 71.1 |
| Example 58 | | | | | | | |
| H₃PO₄ | | | | | | | |
| Extraction | — | — | 0.0 | 0.0 | 100 | — | — |
| Precipitation | 36.39 | 3.01 | 38.39 | 3.17 | — | 95 | 105 |
| Precipitation | 30.12 | 1.40 | 32.72 | 1.51 | — | 45 | 50 |
| Precipitation | 29.75 | 3.12 | 34.39 | 3.58 | — | 108 | 119 |
| Precipitation | 29.78 | 2.80 | 33.78 | 3.17 | — | 95 | 105 |

(1)Based on solid weights and analyses

The application has been described herein by reference to certain preferred embodiments. However, as obvious variations thereon will become apparent to those skilled in the art the invention is not to be considered as limited thereto.

What is claimed is:

1. A method for conducting an acidulation reaction for the production of phosphoric acid, gypsum and alkali metal silicofluoride which comprises reacting phosphate rock, sulfuric acid, and potassium ion provided by addition of a member selected from the group consisting of $KH_2PO_4$, $KHSO_4$, $K_2SO_4$, $KOH$ and mixtures thereof, in sufficient amounts to acidulate the phosphate rock to form phosphoric acid and to cause precipitation of fluorides as potassium silicofluoride, containing the acidulation reaction to obtain reaction products comprising:

a. a phosphoric acid solution; and
   b. a gypsum solids precipitate containing potassium silicofluoride;

separating the gypsum precipitate from the phosphoric acid solution, removing the gypsum solids precipitate to an extractor maintained at a temperature of about 60°–100° C., contacting the gypsum in the extractor with an extractant solution selected from the group consisting of, (a) 5–30 weight percent phosphoric acid containing up to 0.3 parts of sulfuric acid per part of gypsum solids to be extracted, and (b) a fluorine-containing phosphoric acid containing up to 0.3 parts of sulfuric acid per part of gypsum being extracted, said extraction being carried out by contacting the gypsum mixture with a ratio of 3–10 parts of phosphoric acid solution per part of the gypsum mixture at a temperature of about 60°–100° C., separating and recovering the gypsum solids and a phosphoric acid extractant solution containing potassium silicofluoride.

2. A method according to claim 1 wherein the gypsum solids mixture is extracted with a phosphoric acid extracting solution containing up to about 0.3 parts of sulfuric acid per part of gypsum mixture to be extracted.

3. A method according to claim 1 wherein the gypsum solids mixture is extracted with a phosphoric acid extracting solution containing fluorine and about 5–25 weight percent $P_2O_5$.

4. A method according to claim 1 wherein the phosphoric acid extractant solution is obtained by washing the extracted gypsum precipitate with hot water.

5. A method for conducting an acidulation reaction for the production of phosphoric acid, gypsum and potassium silicofluoride which comprises reacting phosphate rock, sulfuric acid, and potassium ion provided by addition of a member selected from the group consisting of $KH_2PO_4$, $KHSO_4$, $K_2SO_4$, $KOH$, and mixtures thereof, in sufficient amounts to acidulate the phosphate rock to form phosphoric acid and to cause precipitation of fluorides as potassium silicofluoride, continuing the acidulation reaction to obtain reaction products comprising:

a. a phosphoric acid solution; and
   b. a gypsum solids precipitate containing potassium silicofluoride;

separating the gypsum precipitate from the phosphoric acid solution, removing the gypsum solids precipitate to an extractor maintained at a temperature of about 60°–100° C., contacting the gypsum in the extractor with an extractant solution selected from the group consisting of, (a) 5–30 weight percent phosphoric acid containing up to 0.3 parts of sulfuric acid per part of gypsum solids to be extracted, and (b) a fluorine-containing phosphoric acid containing up to 0.3 parts of sulfuric acid per part of gypsum being extracted, said extraction being carried out by contacting the gypsum mixture with a ratio of 3–10 parts of the phosphoric acid extractant solution per part of the gypsum mixture at a temperature of about 60°–100° C., separating and recovering the gypsum solids and a phosphoric acid extractant solution containing potassium silicofluoride, cooling the phosphoric acid extractant solution and precipitating the potassium silicofluoride from the solution, recovering the solid potassium silicofluoride, and recycling the extractant phosphoric acid to the extraction step.

6. A method according to claim 5 wherein the extraction of the gypsum solids containing the potassium silicofluoride is conducted with weak phosphoric acid containing fluorine, which weak phosphoric acid is obtained by washing of the gypsum solids obtained by the extraction step with sufficient water to form a weak phosphoric acid solution containing 5–25 weight percent $P_2O_5$.

7. A method according to claim 5 wherein the gypsum solids mixture is extracted with a phosphoric acid extracting solution containing up to about 0.3 parts of sulfuric acid per part of gypsum mixture to be extracted.

8. A method according to claim 5 wherein the gypsum solids mixture is extracted with a phosphoric acid extracting solution containing fluorine and about 5–25 weight percent $P_2O_5$.

* * * * *